UNITED STATES PATENT OFFICE 2,038,025

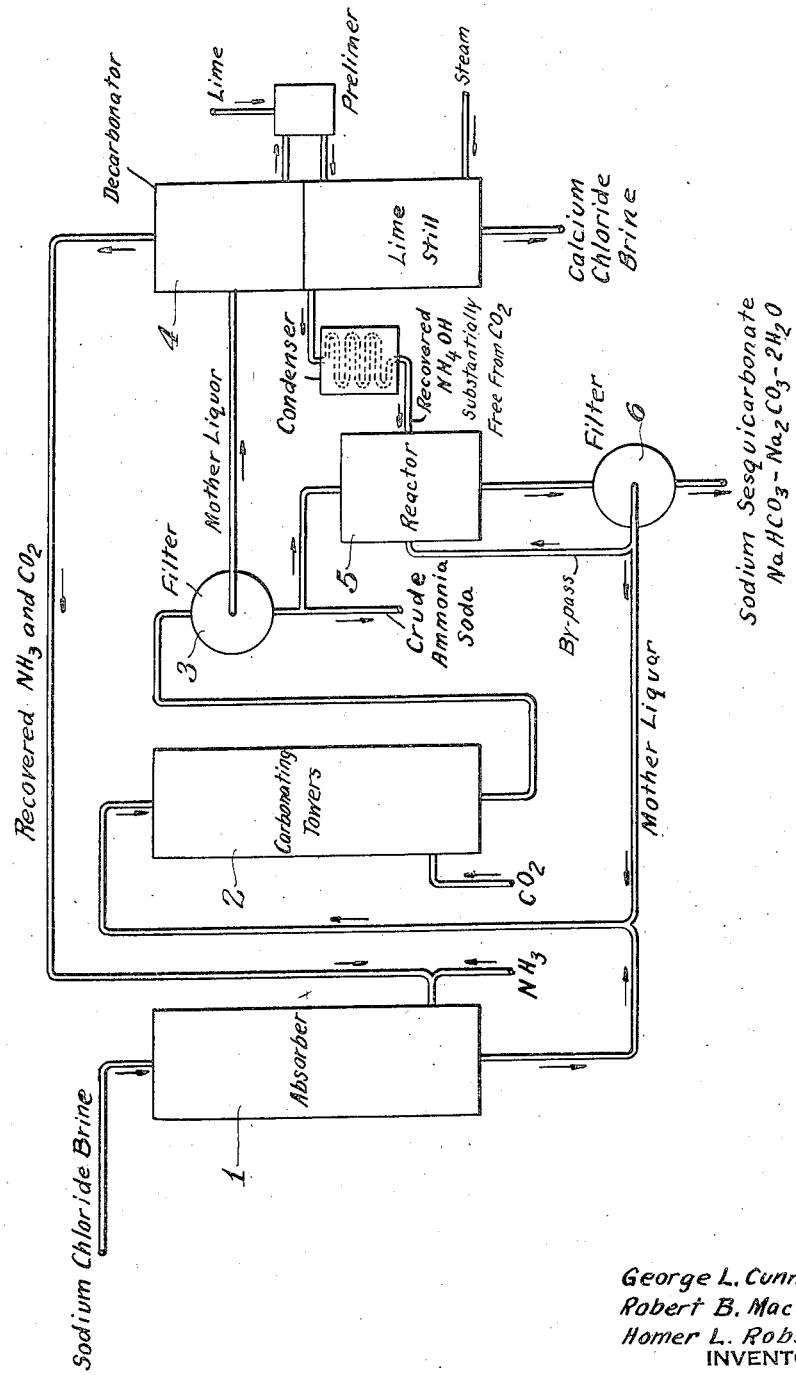

MANUFACTURE OF SODIUM SESQUICARBONATE FROM BICARBONATE

George Lewis Cunningham, Robert B. MacMullin, and Homer Louis Robson, Niagara Falls, N. Y., assignors to The Mathieson Alkali Works, Inc., New York, N. Y., a corporation of Virginia Application March 30, 1932, Serial No. 601,992

8 Claims. (Cl. 23—63)

This invention relates to improvements in the production of sodium sesquicarbonate. Sodium sesquicarbonate, commonly designated trona, has the empirical formula $$NaHCO_3 \cdot Na_2CO_3 \cdot 2H_2O$$

Sodium sesquicarbonate has, heretofore, been artificially prepared by carbonating an aqueous solution of sodium carbonate. This invention relates particularly to improvements which make possible direct production of sodium sesquicarbonate from sodium bicarbonate without intermediate conversion of sodium bicarbonate to sodium carbonate and without carbonation.

According to the present invention, sodium bicarbonate is converted to sodium sesquicarbonate by subjecting the sodium bicarbonate to treatment with ammonia in the presence of water, the ammonia being present in concentration less than that at which ammonia containing salts such as sodium carbamate are precipitated. The reaction mixture should be substantially free from carbon dioxide as such. The sodium bicarbonate may be subjected to treatment with an aqueous solution of ammonia or an aqueous solution or slurry of sodium bicarbonate may be subjected to treatment with ammonia gas, for example. Sodium sesquicarbonate is formed as follows:

$$3NaHCO_3 + NH_3 + 2H_2O = NaHCO_3 \cdot Na_2CO_3 \cdot 2H_2O + NH_4HCO_3$$

and precipitated from the solution or slurry to be separated in any convenient manner, as by filtering or by centrifuging.

The invention will be illustrated by the following specific example:

1. Pure dry sodium bicarbonate is treated with an aqueous solution of ammonia containing 26% $NH_3$ in the proportion of 44.1 parts (by weight) of sodium bicarbonate to 31.1 parts of the ammonia solution at a temperature of 30° C. 35 parts of sodium sesquicarbonate are separated from the mother liquor by centrifuging. The balance of the sodium bicarbonate dissolves in the ammonia solution and this mother liquor is separated from the precipitated sodium sesquicarbonate with the ammonia solution, at a temperature of 30° C., by filtering or by centrifuging for example. The separated sodium sesquicarbonate may be washed and dried or may be dried without washing. The sodium sesquicarbonate may be dried in a current of warm air or by any other convenient method.

The molecular ratio of $NH_3$ to $NaHCO_3$ should not exceed about 9.0. If the molecular ratio of $NH_3$ to $NaHCO_3$ exceeds about 9.0 compounds containing ammonia will be formed. Usually a molecular ratio of $NH_3$ to $NaHCO_3$ upwards of about 0.6–0.9 is necessary to start the conversion of $NaHCO_3$ to $NaHCO_3 \cdot Na_2CO_3 \cdot 2H_2O$. If the proportion of water is too great, the recovery of sodium sesquicarbonate is limited by the solubility of this salt in water. The minimum proportion of water should best be not less than a value corresponding to an aqueous ammonia solution containing about 35–40% $NH_3$. The optimum range of proportions, with respect to recovery of sodium sesquicarbonate, of sodium bicarbonate, ammonia and water produces a thick slurry. The ease of handling this slurry can be promoted, but with some sacrifice of speed of reaction, by diluting the slurry with mother liquor separated from precipitated sodium sesquicarbonate following the conversion. For example, 1–3 parts of mother liquor may be used to dilute 4 parts of the slurry. The speed of reaction may be increased by carrying out the reaction at elevated temperature, 40–60° C. for example. The crystalline character of the sodium sesquicarbonate produced also is improved by carrying out the reaction at elevated temperature, at a temperature in the range 40–60° C. or at a higher temperature for example. The reaction mixture need not be maintained at such elevated temperature for the entire reaction period; it is sufficient if the elevated temperature be attained during the reaction. At elevated temperatures the reaction is carried out under pressure appropriate to maintain the ammonia concentration. For maximum conversion, the molecular ratio of $NH_3$ to $NaHCO_3$ should be decreased about 0.4% and the molecular ratio of $H_2O$ to $NH_3$ should be decreased about 1%, from the optimum ratios at 30° C., for each degree C. increase in reaction temperature. When the reaction is carried out at elevated temperature, the reaction mixture is with advantage cooled before separation of the precipitated sodium sesquicarbonate, to 30° C. or to a lower temperature for example. An operation combining conversion at 40–60° C. with subsequent separation at 30° C. or some lower temperature is particularly advantageous.

In place of pure sodium bicarbonate, crude ammonia soda may be used, due allowance being made for its actual content of sodium bicarbonate and its water content. The reaction proceeds in the presence of other salts, such as sodium chloride and ammonium chloride.

In carrying out the invention, as illustrated in the foregoing example for example, ammonia may be recovered by distillation from mother liquor from which the sodium sesquicarbonate is separated. Concentration of the solution during such distillation precipitates an additional yield of sodium sesquicarbonate. After being deprived of its ammonia content, the mother liquor remaining consists essentially of a solution of sodium carbonate. This solution may be concentrated to recover sodium carbonate, or it may be causticized with lime to product caustic soda, for example.

The invention will be further illustrated by the following specific examples:

2. 41 parts of pure dry sodium bicarbonate are made into a slurry with 23 parts of water, and 8.7 parts of ammonia gas are passed into the slurry, the slurry being agitated and being brought to a temperature of about 50-60° C. during the reaction. After cooling to 30° C., 28 parts of sodium sesquicarbonate are separated from the mother liquor by centrifuging.

Usually the heat of absorption of the ammonia is sufficient to bring the reaction mixture to a temperature of about 50° C. or higher. If it is not, external heat may be supplied.

3. 41 parts of pure dry sodium bicarbonate are made into a slurry with 23 parts of water, from 16 to 48 parts of mother liquor from a previous conversion are added to this slurry, and 8.7 parts of ammonia gas are passed into the slurry mixture, the slurry mixture being brought to a temperature of about 50-60° C. during the reaction. After cooling to 30° C., 28 parts of sodium sesquicarbonate are separated from the mother liquor by filtering.

Instead of diluting the aqueous slurry with mother liquor, the sodium bicarbonate can be made into a slurry with the mother liquor and the water added to this slurry, or the sodium bicarbonate can be made into a slurry with a mixture of the mother liquor and the water.

4. Crude ammonia soda, containing approximately 14.5% H₂O, is treated with an aqueous solution of ammonia containing 33% NH₃ in the proportion of 50 parts of crude ammonia soda to 25 parts of the ammonia solution at a temperature of 30° C. 31 parts of sodium sesquicarbonate are separated from the mother liquor by filtering.

5. 46 parts of crude ammonia soda, containing approximately 14.5% H₂O, are made into a slurry with 17 parts of water, and 9 parts of ammonia gas are passed into the slurry. The reaction is almost instantaneous at a temperature of 20-25° C. 24 parts of sodium sesquicarbonate are separated from the mother liquor by centrifuging.

6. 46 parts of crude ammonia soda, containing approximately 14.5% H₂O, are made into a slurry with 17 parts water, from 18-54 parts of mother liquor from a previous conversion are added to the slurry, and 9 parts of ammonia gas are passed into the slurry mixture, the slurry mixture being brought to a temperature of about 50-60° C. After cooling to 30° C., 24 parts of sodium sesquicarbonate are separated by centrifuging.

The invention may be carried out in more or less continuous fashion. Operations such as those illustrated by Examples 2, 3, 5 and 6, for example, may readily be carried out in towers through which the slurry passes in contact with ammonia gas. The invention may also be carried out in continuous fashion in combination with the conventional soda process.

In one particularly advantageous way of carrying out the invention, the production of sodium sesquicarbonate is combined with the conventional ammonia soda process. In so carrying out the invention, crude ammonia soda, or a part of the crude ammonia soda, from the ammonia soda process is subjected to treatment with an aqueous solution containing ammonia, or part of the ammonia, recovered from the ammonium chloride brine from which the crude ammonia soda is separated in the ammonia soda process and sodium sesquicarbonate is thereby precipitated, the precipitated sodium sesquicarbonate is separated from the mother liquor, and this mother liquor is combined with the ammoniacal sodium chloride brine subjected to carbonation in the ammonia soda process. The separated brine containing sodium and ammonium carbonates is added directly to the sodium chloride brine either before or after, but advantageously after, absorption of any remaining part of the ammonia recovered from the ammonium chloride brine from which the crude ammonia soda is separated. Part of the mother liquor may be recirculated through the treatment of the crude ammonia soda with aqueous ammonia as a diluent. The accompanying drawing illustrates, as a flow sheet, this way of carrying out the invention. In the accompanying drawing, 1, 2, 3, and 4 represent, respectively, the absorber and the carbonating towers in which the sodium chloride brine is saturated with ammonia and carbon dioxide, the filter in which the crude sodium bicarbonate produced is separated from the mother liquor and the recovery still in which ammonia, together with some carbon dioxide, is recovered from the mother liquor as in the conventional ammonia soda process, and 5 and 6 represent, respectively, the reactor in which crude sodium bicarbonate separated in the filter 3 is subjected to treatment with an aqueous solution of ammonia and the filter in which the sodium sesquicarbonate produced is separated from the mother liquor, the aqueous solution of ammonia utilized for the treatment comprising a part of the mother liquor from the filter 6 and a part of the ammonia from the recovery still 4. In so carrying out the invention the mother liquor from which the sodium sesquicarbonate is separated is so concentrated that the conversion of sodium chloride to sodium bicarbonate, in the ammonia soda process, is not substantially lowered, and at the same time the soda content of the brine from which the sodium sesquicarbonate is separated is substantially completely separated as sodium bicarbonate together with the sodium bicarbonate produced in the ammonia soda process. The reaction producing the sodium sesquicarbonate is advantageously carried out with ammonia recovered from the ammonium chloride brine, in the conventional ammonia soda process, following separation of carbon dioxide.

We claim:

1. In the conversion of sodium bicarbonate to sodium sesquicarbonate without the removal of carbon dioxide from the reaction mixture, the improvement which comprises subjecting the bicarbonate to treatment at a temperature of about 20°-60° C. with ammonia in the presence of water and thereby precipitating sodium sesquicarbonate, the ammonia being present in concentration less than that at which ammonia containing salts are precipitated, the molecular ratio of ammonia to the bicarbonate being not less than 0.6 and the reaction being carried out at a pressure appropriate to maintain such minimum ratio of ammonia to sodum bicarbonate.

2. In the conversion of sodium bicarbonate to sodium sesquicarbonate without the removal of carbon dioxide from the reaction mixture, the improvement which comprises subjecting an aqueous slurry of the bicarbonate to treatment at a temperature of about 20°–60° C. with ammonia in the presence of water and thereby precipitating sodium sesquicarbonate, the ammonia being present in concentration less than that at which ammonia containing salts are precipitated, the molecular ratio of ammonia to the bicarbonate being not less than 0.6 and the reaction being carried out at a pressure appropriate to maintain such minimum ratio of ammonia to sodium bicarbonate.

3. In the conversion of sodium bicarbonate to sodium sesquicarbonate without the removal of carbon dioxide from the reaction mixture, the improvement which comprises subjecting the bicarbonate to treatment at a temperature of about 40°–60° C. with ammonia in the presence of water and thereby precipitating sodium sesquicarbonate, the ammonia being present in concentration less than that at which ammonia containing salts are precipitated, the molecular ratio of ammonia to the bicarbonate being not less than 0.6 and the reaction being carried out at a pressure appropriate to maintain such minimum ratio of ammonia to sodium bicarbonate.

4. In the conversion of sodium bicarbonate to sodium sesquicarbonate without the removal of carbon dioxide from the reaction mixture, the improvement which comprises subjecting the bicarbonate to treatment at a temperature of about 40°–60° C. with ammonia in the presence of water, cooling the mixture to a temperature not exceeding about 30° C. and thereby precipitating sodium sesquicarbonate, the ammonia being present in concentration less than that at which ammonia containing salts are precipitated, the molecular ratio of ammonia to the bicarbonate being not less than 0.6 and the reaction being carried out at a pressure appropriate to maintain such minimum ratio of ammonia to sodium bicarbonate.

5. In the conversion of sodium bicarbonate to sodium sesquicarbonate without the removal of carbon dioxide from the reaction mixture, the improvement which comprises subjecting the bicarbonate to treatment at a temperature of about 20°–60° C. with ammonia in the presence of water and mother liquor from which sodium sesquicarbonate has been separated following a previous conversion and thereby precipitating sodium sesquicarbonate, the ammonia being present in concentration less than that at which ammonia containing salts are precipitated, the molecular ratio of ammonia to the bicarbonate being not less than 0.6 and the reaction being carried out at a pressure appropriate to maintain such minimum ratio of ammonia to sodium bicarbonate.

6. In the conversion of sodium bicarbonate to sodium sesquicarbonate without the removal of carbon dioxide from the reaction mixture, the improvement which comprises subjecting the bicarbonate to treatment at a temperature of about 40°–60° C. with ammonia in the presence of water and mother liquor from which sodium sesquicarbonate has been separated following a previous conversion and thereby precipitating sodium sesquicarbonate, the ammonia being present in concentration less than that at which ammonia containing salts are precipitated, the molecular ratio of ammonia to the bicarbonate being not less than 0.6 and the reaction being carried out at a pressure appropriate to maintain such minimum ratio of ammonia to sodium bicarbonate.

7. In the combined production of sodium bicarbonate and sodium sesquicarbonate without the removal of carbon dioxide from the reaction mixture and by the ammonia soda process, the improvement which comprises subjecting a part of the crude ammonia soda to treatment at a temperature of about 20°–60° C. with an aqueous solution including part of the ammonia recovered from the ammonium chloride brine from which the crude ammonia soda is separated in the ammonia soda process and thereby precipitating sodium sesquicarbonate, the ammonia being present in concentration less than that at which ammonia containing salts are precipitated, the molecular ratio of ammonia to the bicarbonate being not less than 0.6 and the reaction being carried out at a pressure appropriate to maintain such minimum ratio of ammonia to sodium bicarbonate, separating the precipitated sodium sesquicarbonate from the mother liquor and combining the separated mother liquor with the ammoniacal sodium chloride brine subjected to carbonation in the ammonia soda process.

8. In the production of sodium sesquicarbonate without the removal of carbon dioxide from the reaction mixture and by the ammonia soda process, the improvement which comprises subjecting crude ammonia soda from the ammonia soda process to treatment at a temperature of about 20°–60° C. with an aqueous solution containing ammonia recovered from the ammonium chloride brine from which the crude ammonia soda is separated in the ammonia soda process and thereby precipitating sodium sesquicarbonate, the ammonia being present in concentration less than that at which ammonia containing salts are precipitated, the molecular ratio of ammonia to the bicarbonate being not less than 0.6 and the reaction being carried out at a pressure appropriate to maintain such minimum ratio of ammonia to sodium bicarbonate, separating the precipitated sodium sesquicarbonate from the mother liquor, and combining separated mother liquor with the ammoniacal brine subjected to carbonation in the ammonia soda process.

GEORGE LEWIS CUNNINGHAM.
ROBERT B. MacMULLIN.
HOMER LOUIS ROBSON.